(12) United States Patent
Shen

(10) Patent No.: US 7,945,278 B2
(45) Date of Patent: May 17, 2011

(54) COMMUNICATION METHOD, COMMUNICATION SYSTEM, AND COMMUNICATION TERMINAL

(75) Inventor: Zhuan Shen, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 647 days.

(21) Appl. No.: 11/460,824

(22) Filed: Jul. 28, 2006

(65) Prior Publication Data

US 2007/0060181 A1    Mar. 15, 2007

(30) Foreign Application Priority Data

Jul. 28, 2005 (JP) ................................. 2005-219401

(51) Int. Cl.
| | |
|---|---|
| H04B 7/00 | (2006.01) |
| H04M 11/04 | (2006.01) |
| H04M 3/00 | (2006.01) |
| H04M 5/00 | (2006.01) |

(52) U.S. Cl. ..................... 455/518; 455/519; 455/404.1; 455/404.2; 379/266.01; 379/266.03; 379/266.04

(58) Field of Classification Search .......... 455/518–519, 455/404.1–404.2; 379/266.01, 266.03, 265.046
See application file for complete search history.

(56) References Cited

U.S. PATENT DOCUMENTS

| | | | | |
|---|---|---|---|---|
| 5,249,304 A | * | 9/1993 | Mulford | 455/512 |
| 5,457,735 A | * | 10/1995 | Erickson | 455/450 |
| 7,483,708 B2 | * | 1/2009 | Maggenti | 455/518 |
| 2003/0078064 A1 | * | 4/2003 | Chan | 455/514 |
| 2004/0266468 A1 | * | 12/2004 | Brown et al. | 455/518 |
| 2005/0032539 A1 | * | 2/2005 | Noel et al. | 455/518 |
| 2005/0124365 A1 | * | 6/2005 | Balasuriya et al. | 455/518 |
| 2005/0176454 A1 | * | 8/2005 | Chakraborty et al. | 455/518 |
| 2006/0058052 A1 | * | 3/2006 | Plestid et al. | 455/519 |
| 2007/0037599 A1 | * | 2/2007 | Tillet et al. | 455/521 |

FOREIGN PATENT DOCUMENTS

| | | |
|---|---|---|
| JP | 08009063 A | 1/1996 |
| JP | 09219750 A | 8/1997 |
| JP | 2003061183 A | 2/2003 |
| JP | 2003-174520 | 6/2003 |

OTHER PUBLICATIONS

Japanese language office action and its English language translation for corresponding Japanese application 2005219401 lists the references above, May 6, 2010.

* cited by examiner

*Primary Examiner* — Marivelisse Santiago-Cordero
(74) *Attorney, Agent, or Firm* — DLA Piper LLP (US)

(57) ABSTRACT

A one-to-multitude group communication method and group communication system enabling a user of each communication terminal to predict transmission permission and a communication terminal used in this one-to-multitude group communication system, where when a communication terminal requests the transmission permission from a communication management system, the information concerning communication terminals waiting for transmission permission in the communication system is provided from the communication management system to all communication terminals and this information is displayed on a display part of each communication terminal. Due to this, each communication terminal can determine communication terminals waiting for the transmission permission in the communication system, therefore, even if transmission is not permitted at a point of time when it issues the request, it can predict how long it must wait for obtaining the transmission permission.

17 Claims, 8 Drawing Sheets

COMMUNICATION METHOD, COMMUNICATION SYSTEM, AND COMMUNICATION TERMINAL

BACKGROUND OF THE INVENTION

1. Field of the Invention

The present invention relates to a one-to-multitude communication method by mobile phones and other communication terminals, a communication system of the same, and a communication terminal for performing one-to-multitude communications.

2. Description of the Related Art

In recent years, the modes of communication by phones have become greatly diversified. Phones able to perform packet communications utilizing the IP (Internet Protocol) network are being widely utilized in addition to conventional speech by circuit switched connection. For example, Japanese Patent Publication (A) No. 2003-174520 discloses "Chat Mail" for conversation between mobile phones by exchanging text in real time. Chat Mail is one of the modes of communication called "group communication" were pre-registered members form a group and transferring text and other data in real time in the group.

In this group communications, attempts have been made for speech by utilizing VoIP (Voice Over Internet Protocol). One of these is called the PoC (Push to Talk Over Cellular). In the PoC, an SIP (Session initiation Protocol) server manages each group and each member in the group and control voice calls in a packet format.

When performing one-to-multitude communications in such group communications, usually only one communication terminal permitted by a server system can transmit data (for example audio data) to the other communication terminals. When a plurality of communication terminals simultaneously try to transmit data, in general the server system selects one communication terminal for transmission permission according to a certain rule. For example, it considers for example the number of times transmission was desired in the past and rejected and sets a priority order of permission of transmission for terminals so as to enable as fair transmission by the terminals as possible.

Even when the server system sets such a fair priority order, on the communication terminal side, requests for transmission permission continue to be unilaterally rejected by the server system as usual, therefore a user of a communication terminal cannot estimate when transmission will permitted and sometimes feel dissatisfied.

Further, each time a request for transmission permission is rejected by the server system, the communication terminal must issue another request to the server system, therefore the operation is troublesome.

SUMMARY OF THE INVENTION

A first object of the present invention is to provide a one-to-multitude communication method enabling a user of each communication terminal to estimate when it can obtain transmission permission.

A second object of the present invention is to provide a one-to-multitude communication system enabling a user of each communication terminal to estimate when it can obtain transmission permission.

A third object of the present invention is to provide a communication terminal used in such a one-to-multitude communication system.

According to the present invention, information concerning communication terminals waiting for transmission permission in the communication system are displayed at each communication terminal, therefore the user of each communication terminal can estimate when transmission permission will be obtained based on the information.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Figure 1:
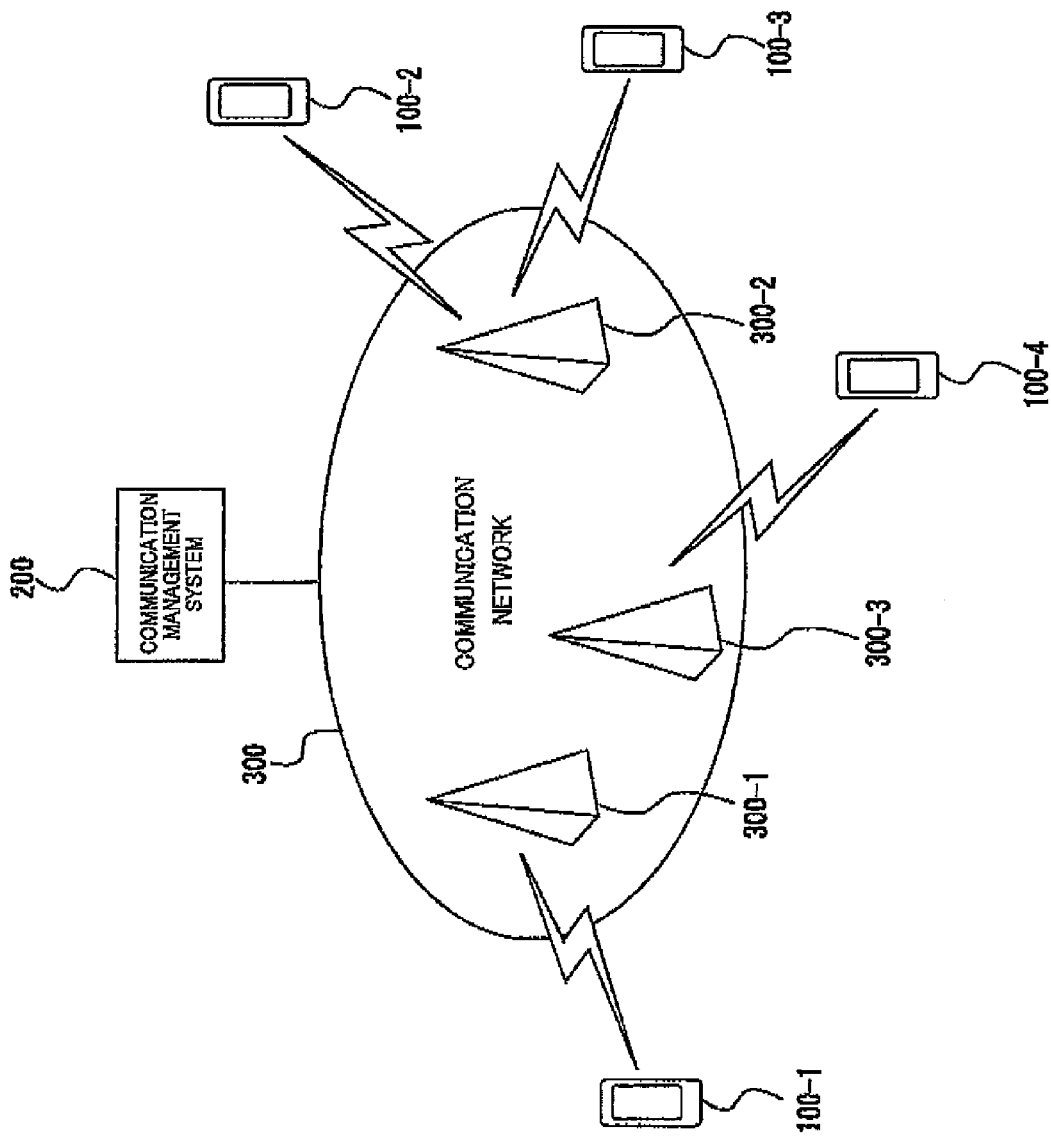
FIG. 1 is a diagram showing an example of the configuration of a communication system according to an embodiment of the present invention.

FIG. 1 is a diagram showing an example of the configuration of a communication system according to a first embodiment of the present invention.

The communication system according to the present embodiment, for example as shown in FIG. 1, has three or more communication terminals (100-1, 100-2, 100-3, ... ) and a communication management system 200.

The communication terminals 100-*i* (i indicates a positive natural number) are wireless communication terminals such as mobile phones connected to a communication network 300 via base stations (300-1, 300-2, 300-3, ... ). Further, the communication terminals 100-*i* engage in data communications under the control of the communication management system 200 connected to the communication network 300. In the present embodiment, as an example, it is assumed that group communications are carried out according to the PoC (Push to Talk over Cellular) scheme.

The data transmitted in this data communications includes data for example speech, images, and text).

In the present communication system, one communication terminal given transmission permission by the communication management system 200 among the three or more communication terminals (100-1, 100-2, 100-3, ... ) can transmit data to the other plurality of communication terminals. A communication terminal desiring to transmit data transmits a request for communication permission to the communication management system 200.

Further, the communication terminal 100-*i* has a display part able to display various types of information provided from the communication management system 200. When the communication terminal requests the communication permission mentioned above to the communication management system 200, information (first information) concerning the communication terminals currently waiting for communication permission in the communication system is transmitted from the communication management system 200 to the communication terminal. Each communication terminal receives the information from the communication management system 200 and displays it at the display part.

The communication management system 200 is a system for managing PoC group communications by three or more communication terminals (100-1, 100-2, 100-3, ...).

When receiving a start request of PoC group communications from one communication terminal, the communication management system 200 calls up the communication terminals of the other parties in response to that request and establishes a communication session.

After the establishment of the communication session, the communication management system 200 receives transmission permission requests from communication terminals participating in the communication. The communication management system 200 holds a list (hereinafter called a reservation list) for managing the order of the communication terminals waiting for transmission permission in the communication system. When receiving a request for transmission permission from one communication terminal, it registers the requesting side communication terminal in the reservation list.

Further, when one communication terminal finishes transmission and the communication terminal given transmission permission next registered in the reservation list starts the transmission, the communication management system 200 deletes the communication terminal starting transmission from the reservation list.

The communication management system 200 successively gives transmission permission to one of the three or more communication terminals (100-1, 100-2, 100-3, ...) according to the reservation list updated in this way.

Note that the communication management system 200 in the present embodiment determines the order for giving transmission permission to the communication terminals based on a freely determined rule. For example, the communication management system 200 may give transmission permission in a sequence from the terminal issuing the transmission permission request earliest. Further, in order to ensure fairness among terminals, for example, it may adjust the order of transmission so that the degree of priority of a terminal having a smaller number of times of permission of transmission and a terminal having a shorter transmission time become higher.

Further, the communication management system 200 may give transmission permission to a communication terminal issuing a transmission permission request as it is when none of the communication terminals are engaged in transmission in the communication system and the communication terminals are not registered in the reservation list.

The communication management system 200 transmits information (first information) concerning the communication terminals waiting for transmission permission registered in the reservation list to the communication terminals (100-1, 100-2, ...). The communication management system 200 may transmit this information to all communication terminals whenever the content of the reservation list is updated or may individually transmit the information to communication terminals issuing requests when requests for acquisition of this information are issued from the individual communication terminals.

Figure 2:
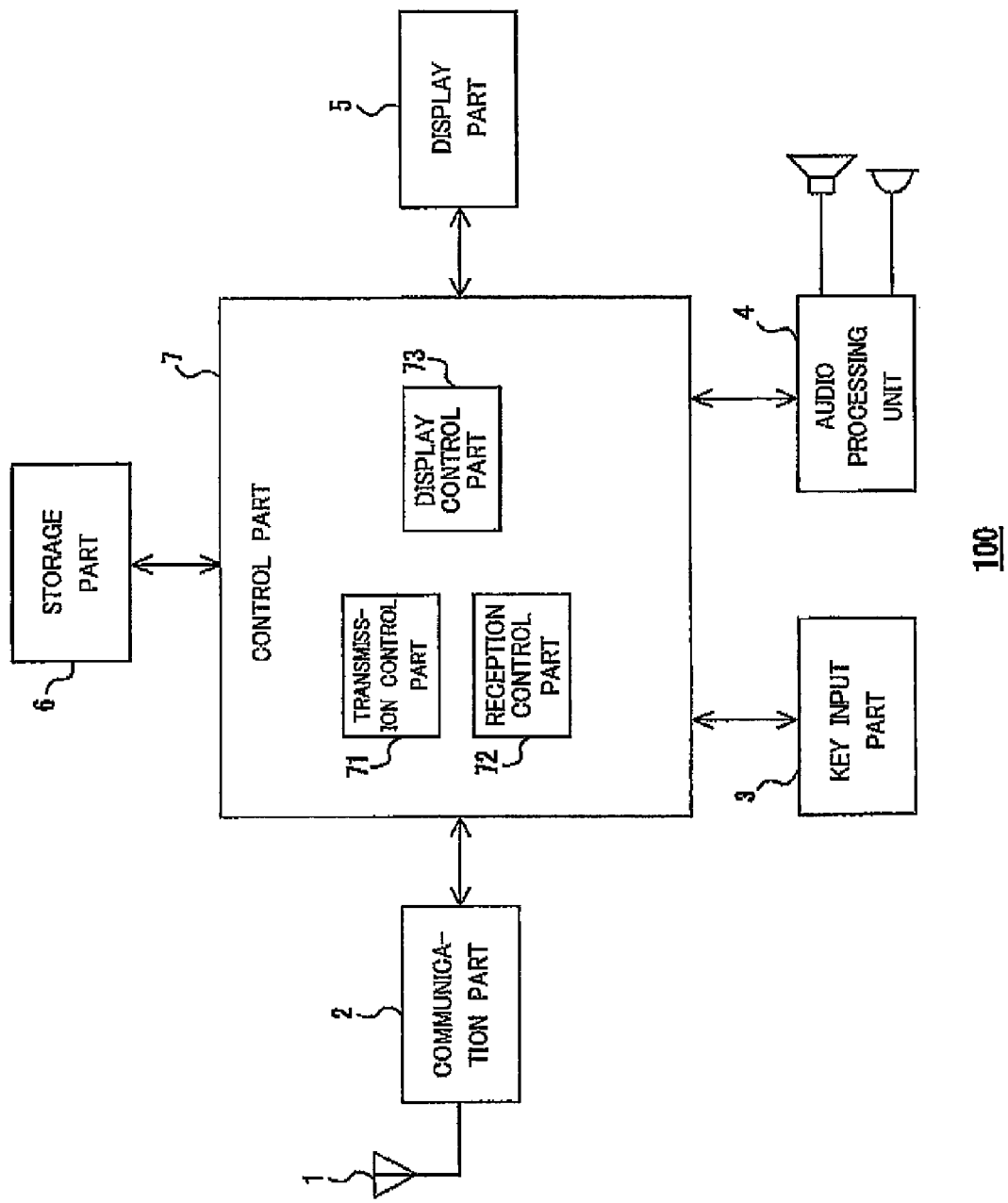
FIG. 2 is a diagram showing an example of the configuration of a communication terminal according to an embodiment of the present invention.

FIG. 2 is a diagram showing an example of the configuration of a communication terminal (100-1, 100-2, ...) according to the present invention.

Each communication terminal (100-1, 100-2, ...), for example, as shown in FIG. 2, has an antenna 1, communication part 2, key input part 3, audio processing unit 4, display part 5, storage part 6, and control part 7.

The communication part 2 performs processing concerning wireless communication with a base station (300-1, 300-2) of the communication network 300. For example, it applies predetermined modulation processing to the transmission data supplied from the control part 7 to convert it to a wireless signal and transmits the same from the antenna 1. Further, it applies predetermined demodulation processing to a wireless signal from a base station received at the antenna 1 to convert the same to reception data and outputs the same to the control part 7.

The communication terminal communicates with the communication management system 200 or other communication terminal connected to the communication network 300 via this communication part 2.

The key input part 3 is a device for inputting an instruction of a user to the communication terminal (100-1, 100-2, ...). It has keys having various types of functions for example number keys, letter keys, arrow keys, and an enter key. When these keys are operated by the user, the content is converted to electric signals and output to the control part 7.

Further, the key input part 3 is provided with a key (transmission key) for switching between transmission and reception in PoC. When the user operates this transmission key, the communication part 2 transmits a transmission permission request to the communication management system 200.

The audio processing unit 4 processes the audio signal input/output at a speaker or a microphone. Namely, it applies signal processing such as amplification, analog-digital conversion, and encoding to the audio signal input from the microphone to convert it to digital audio data which it outputs to the control part 7. Further, it applies signal processing such as decoding, digital-analog conversion, and amplification to the audio data supplied from the control part 7 to convert this to an analog audio signal which it outputs to the speaker.

The display part 5 is configured by using a liquid crystal display panel or organic EL panel or other display devices and displays an image in accordance with the image data supplied from the control part 7. For example, it displays the phone number of the other party at the time of call transmission, the phone number of the other party of at the time of call reception, content of received mail and sent mail, a waiting screen, the date, time, and remaining battery power.

Further, when engaging in group communications according to the PoC, the display part 5 displays various types of information and notifications sent from the communication management system 200. For example, it displays a table of communication terminals participating in the group communications, the information of the reservation list (information of communication terminals waiting for transmission permission, etc.), notifications concerning the updating of the reservation list, requests and messages issued from one communication terminal to the other communication terminals, responses of other communication terminals with respect to such requests or messages, and so on.

The storage part 6 stores various types of data utilized in the processing of the control part 7 and the data of the processing results of the control part 7. For example, it stores a computer program of the control part 7, constant data used for that processing, and variable data which must be temporarily stored in the processing process.

The control part 7 performs various processing concerning the overall operation of the communication terminal (100-1, 100-2, . . . ).

For example, the input/output of speech in the audio processing unit 4, the input of text data from the key input part 3, the display of information in the display part 5, and the transmission and reception of the data in the communication part 2 are controlled so that speech and data communication are suitably carried out according to a predetermined protocol in the PoC as the processing concerning the group communication.

The control part 7 has for example a computer for executing processing based on programs (operating system, applications, etc.) stored in the storage part 6 and executes the above processing according to the programs.

The control part 7 has, as processing blocks relating to the PoC group communications, a transmission control part 71, reception control part 72, and display control part 73.

The transmission control part 71 performs processing for transmitting the data from the communication part 2 at the time of PoC group communications. For example, when the transmission key of PoC is depressed at the key input part 3, the communication part 2 transmits a request for transmission permission to the communication management system 200.

The reception control part 72 performs processing for receiving the data at the communication part 2 at the time of PoC group communications. For example, after the communication part 2 transmits the request for transmission permission mentioned above, the communication part 2 receives the information of the reservation list (information concerning the communication terminals waiting for transmission permission in the communication system etc.) transmitted from the communication management system 200.

The display control part 73 performs control concerning the display of information at the display part 5. For example, it displays various types of information and notifications received from the communication management system 200 at the time of the PoC group communications at the display part 5.

Next, an explanation will be given of the configuration of the communication management system 200 according to the present invention.

Figure 3:
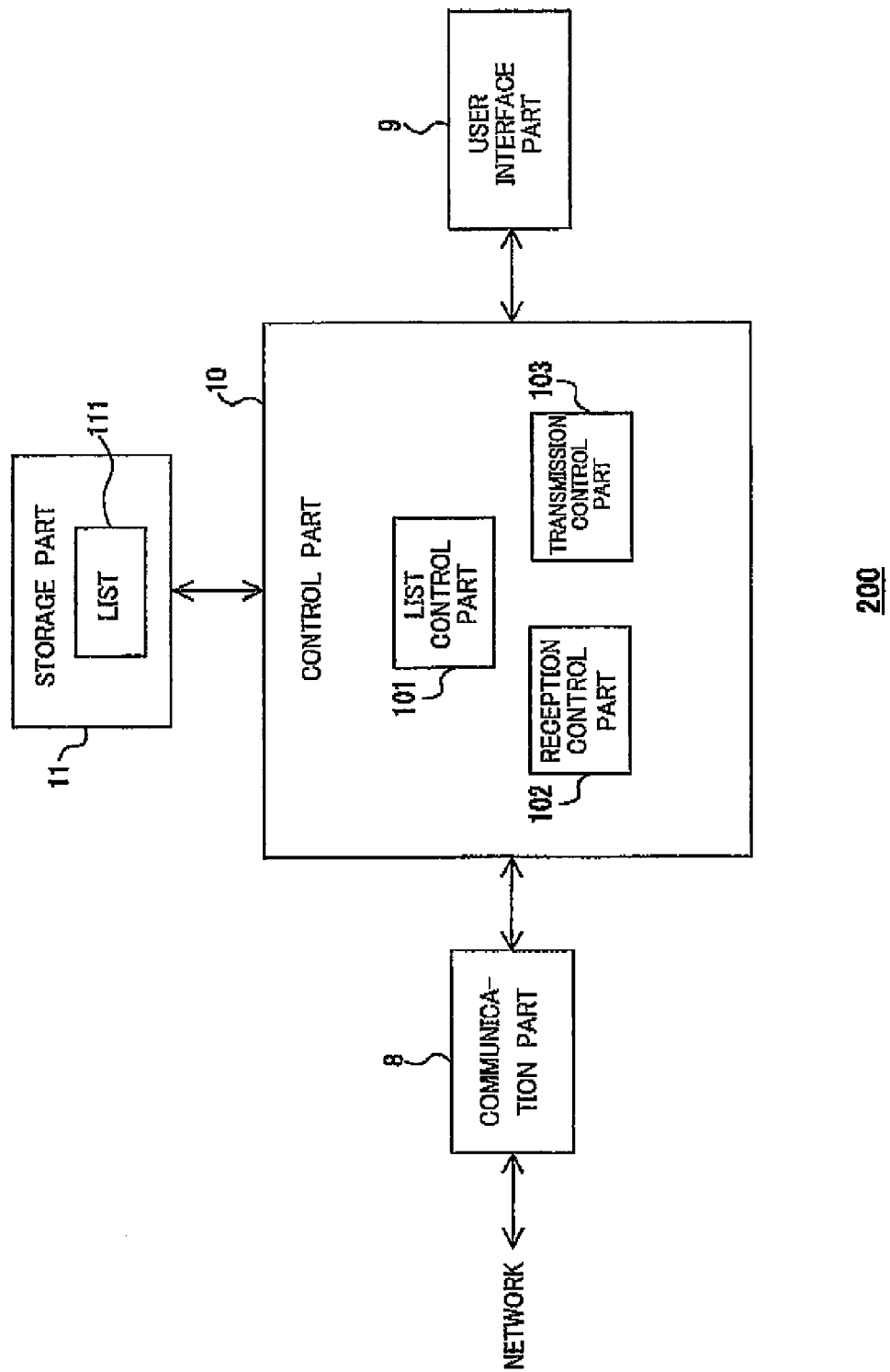
FIG. 3 is a diagram showing an example of the configuration of a communication management system.

FIG. 3 is a diagram showing an example of the configuration of the communication management system 200.

The communication management system 200, for example as shown in FIG. 3, has a communication part 8, user interface part 9, control part 10, and storage part 11.

The communication part 8 performs processing concerning communication via the communication network 300. For example, when engaging in PoC group communication, the communication management system 200 is connected to the IP network. The communication part 8 performs processing concerning the transmission and reception of data via this IP network.

The user interface part 9 includes for example a keyboard, mouse, and display device and inputs/outputs information for operating the communication management system 200.

The storage part 11 stores various types of data utilized in the processing of the control part 10 and the data of the processing results of the control part 10. For example, it stores the computer program of the control part 10, the constant data used for the processing thereof, and the variable data which must be temporarily stored in the processing process.

Further, the storage part 11 stores the reservation list 111 for managing the order of communication terminals waiting for transmission permission in the communication system. The reservation list 111 is comprised of for example identification data of communication terminals waiting for transmission permission. The identification data are arranged according to the order of transmission.

The control part 10 performs various processing concerning the overall operation of the communication management system 200. For example, it performs processing for calling up the communication terminals of the other parties and establishing a communication session when the start of group communication is requested from one communication terminal, processing for updating the reservation list in response to the request of each communication terminal, processing for providing information to each communication terminal, and processing for transmitting notifications.

The control part 10 has for example a computer for executing processing based on programs (operating system, applications, etc.) stored in the storage part 11 and executes processing according to the programs.

The control part 10 has a list control part 101, reception control part 102, and transmission control part 103 as processing blocks relating to the PoC group communications.

The list control part 101 performs processing relating to the updating of the reservation list 111 stores in the storage part 11. For example, when the communication part 8 receives a transmission permission request issued at one communication terminal, the unit registers the communication terminal issuing the request in the reservation list 111. Further, when one communication terminal finishes transmission and the communication terminal given the transmission permission next registered in the reservation list 111 starts the transmission, the unit deletes the communication terminal starting the transmission from the reservation list 111.

The list control part 101 determines the places of communication terminals in the reservation list 111 so that for example to permit transmission in the order from the terminal issuing the transmission permission request earliest. Further, it may adjust the places in the reservation list 111 so that degree of priority of a terminal having a smaller number of times of permission of transmission and a terminal having a shorter transmission time becomes higher.

Further, in the case where the communication part 9 receives a request relating to a change of order of the transmission permission (for example a request of emergency speech and a request of postponing speech) issued from one communication terminal, if the communication part 8 receives a response from another communication terminal accepting this request, the list control part 101 changes the places of these two communication terminals in the reservation list 111.

Further, when the communication part 8 receives a request for canceling the reservation of the transmission permission, the list control part 101 deletes the communication terminal issuing this request from the reservation list 111 and appropriately changes the places of the communication terminals registered in the list.

The reception control part 102 performs processing for receiving data transmitted from the communication terminal at the communication part 8 in the PoC group communication. For example, it receives requests and responses from communication terminals, for example, a request for transmission permission, a request for change of order of transmission permission, a response of acceptance of a request for change of order, and a request for cancellation of a reservation for transmission permission.

The transmission control part 103 performs processing for transmitting data from the communication part 8 to the communication terminals in PoC group communications. For example, when one communication terminal issues a request for acquiring the information of the reservation list 111 and the communication part 8 receives this, the communication part 8 transmits the information of the reservation list 111 (information of the communication terminal waiting for the transmission permission in the communication system etc.) to the communication terminal issuing this request Further, when the list control part 101 updates the reservation list 111, it may transmit the information of the updated reservation list 111 to each communication terminal.

Further, when the reservation list 111 is updated by the list control part 101, when the communication part 8 receives a request or message directed to other communication terminals, when a response of another communication terminal with respect to this request or message is received at the communication part 8, or whether otherwise various events occur in group communications, the transmission control part 103 transmits a notification concerning that event from the communication part 8 to each communication terminal.

Here, the operation of the communication system according to the present embodiment having the above configuration will be explained.

First, the operation where the communication terminal (100-1, 100-2, . . . ) requests speech will be explained with reference to FIG. 4.

When the transmission key of the key input part 3 is depressed at one communication terminal (here, called as terminal A), the transmission control part 71 of the terminal A transmits a transmission permission request to the communication management system 200 via the communication part 8 (step S102).

When the communication part B of the communication management system 200 receives the transmission permission request from the terminal A, the control part 10 judges whether or not the reservation list 111 is stored in the storage part 11 at present (step S104). When the reservation list 111 is not stores in the storage part 11, the control part to judges whether or not there is a terminal during speech in the communication system at present (step S106). If there is no terminal in the speech state, it permits the speech of the terminal A (step S108). In this case, the control part 10 transmits a notification indicating that the terminal A becomes the speaker at present from the communication part B to each communication terminal (step S110). The display control part 73 of each communication terminal displays that the terminal A becomes the speaker at present at the display part 5 in response to the above notification received at the communication part 2 (step S112).

On the other hand, when it is judged at step S106 that there is a terminal of speech state at present, the control part 10 of the communication management system 200 prepares the reservation list 111 in the storage part 11 (step S114) and registers the terminal A in this (step S116). Then, the communication part 8 transmits a notification that the reservation list 111 was changed (that is, was prepared) to each communication terminal (step S118). The display control part 73 of each communication terminal displays that the reservation list 111 was changed at the display part 5 in response to the above notification received at the communication part 2 (step S120).

Further, when it is judged at step 9104 that the reservation list 111 is stored in the storage part 11, the control part 10 of the communication management system 200 judges whether or not the terminal A is registered in this list (step 122). If it is unregistered, it registers the terminal A in the list (step S116). Then, the communication part 8 transmits a notification indicating that the reservation list 111 was changed to each communication terminal (step S118). The display control part 73 of each communication terminal displays that the reservation list 111 was changed at the display part 5 in response to above, notification received at the communication part 2 (step S120).

When the reservation list 111 is stored in the storage part 11 and the terminal A is registered in this list (step S122), the control part 10 of the communication management system 200 judges whether or not the place of the terminal A in the order of this list is a term where it must be given the transmission permission (step S124). When it is the term where the terminal A must be given the transmission permission, the control part 10 permits the speech of the terminal A (step S108) and transmits a notification indicating that the terminal A becomes the speaker at present via the communication part 8 to each communication terminal (step S110). The display control part 73 of each communication terminal displays that the terminal A becomes the speaker at present at the display part 5 in response to the above notification received at the communication part 2 (step S112).

Where the reservation list 111 is stored in the storage part 11 and the terminal A is registered in this list, but the place of the terminal A in the order of the list has not yet been reached the term (step S124), the control part 10 of the communication management system 200 ignores the transmission permission request of the terminal A (step S126)). Due to this, a plurality of registrations of same communication terminals are prevented from being happened in the reservation list 111, therefore the problem that transmissions are dominated by a specific communication terminal can be avoided.

Next, the operation where the order of speech is changed among communication terminals will be explained with reference to FIG. 5.

For example, assume that the communication terminal 100-1 is registered at fourth place in the reservation list 111. In this case, when the user carries out a predetermined operation for requesting emergency speech at the key input part 3 of the communication terminal 100-1, the transmission control part 71 thereof transmits to the communication management system 200 a request to change a order with the communication terminals which having higher place than the fourth place (step S202).

When the communication part 8 of the communication management system 200 receives the above request, the control part 10 thereof transmits a notification indicating that the communication terminal 100-1 is requesting a change of order from the communication part 8 to each communication terminal (step S204).

The display control part 73 of each communication terminal displays that the communication terminal 100-1 requested a change of speech order in the display part 5 in response to above notification received at the communication part 2.

Here, assume that the communication terminal 100-2 registered at first place of the reservation list 111 accepts the request of the change of order. When the key input part 2 of the communication terminal 100-2 is performed a predetermined operation for accepting the request of the change of order, the transmission control part 71 thereof mates the communication part 2 transmit to the communication management system 200 a response of acceptance of the request of the change of order (step S206).

When the communication part 8 of the communication management system 200 receives the above acceptance response, the control part 10 updates the reservation list 111 so as to change the places of the communication terminals 100-1 and 100-2 (step S208). Then, the control part 10 transmits a notification indicating that the reservation list 111 is updated via the communication part 8 to each communication terminal (step S210).

The display control part 73 of each communication terminal displays that the reservation list 111 is updated at the display part 5 in response to above notification received at the communication part 2.

Figure 5:
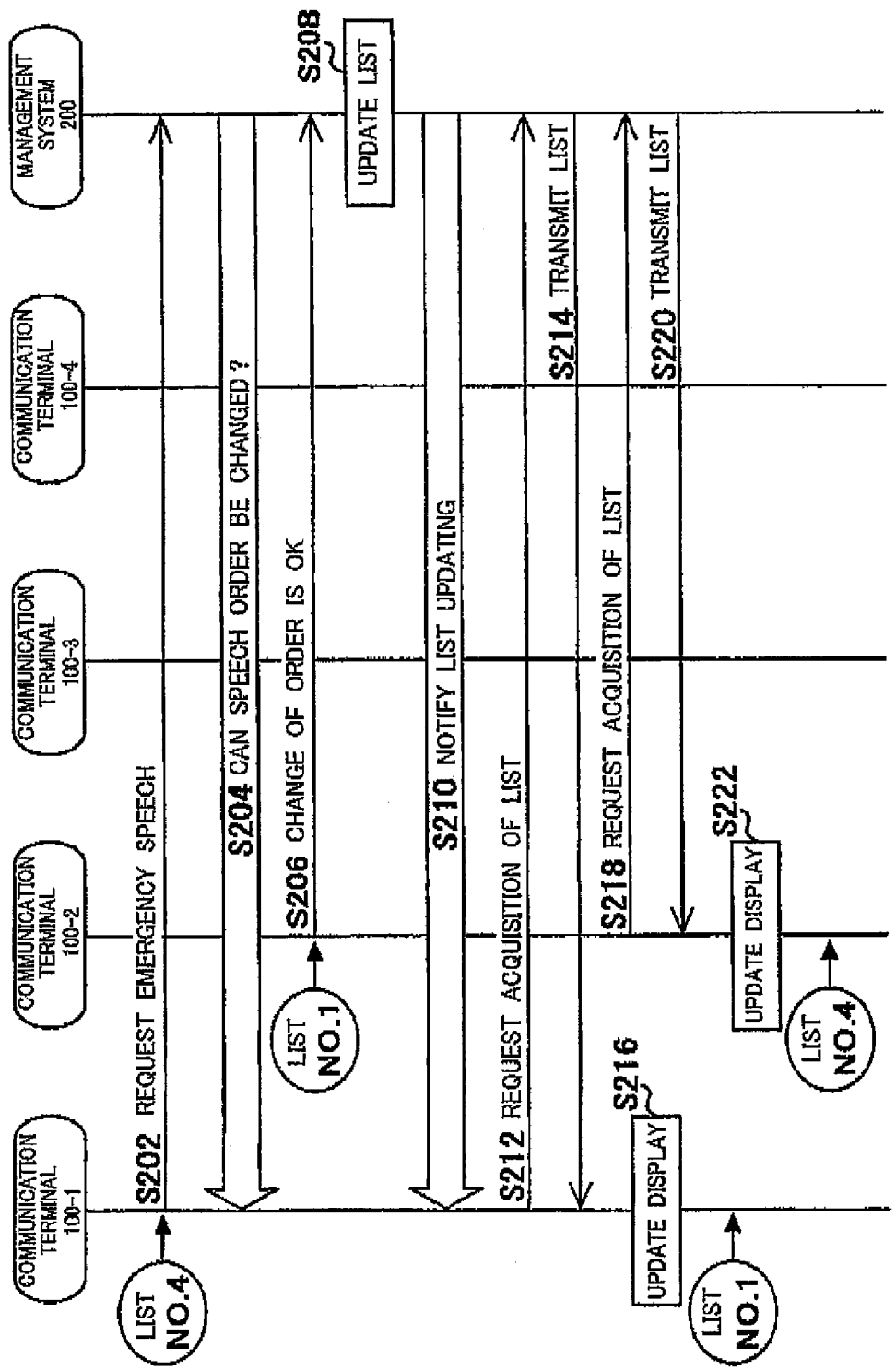
FIG. 5 is a diagram showing an example of an operation for changing the order of speech.

In the example of FIG. 5, the communication terminal receiving the notification of this list updating issues a request for acquisition of information concerning the reservation list 111 to the communication management system 200 (steps S212, S218). The communication management system 200 receiving this transmits the information to the requesting side communication terminal (steps S214, S220).

For example, when the user performs a predetermined operation for requesting the acquisition of the information of the reservation list 111 (information of communication terminals waiting for the transmission permission in the communication system etc.) at the key input part 3 of the communication terminal 100-1, the transmission control part 71 thereof transmits the request from the communication part 2 to the communication management system 200 (step S212). When the communication part 8 of the communication management system 200 receives this request, the control part 10 thereof transmits the information of the reservation list 111 to the requesting side communication terminal 100-1 (step S214). The display control part 73 of the communication terminal 100-1 updates the display of the display part 5 based on the information of the reservation list 111 received at the communication part 2. Due to this, the display part 5 displays that place of the speech order between the communication terminals 100-1 and 100-2 was changed.

Next, another operation in the case where the order of speech is changed will be explained with reference to FIG. 6.

In the example of FIG. 5, when the reservation list 111 is updated along with the change of order, the communication management system 200 transmits a notification concerning the updating of the list to each communication terminal. Then, the communication management system 200 transmits the information of the updated reservation list 111 only to the communication terminal issuing the information acquisition request in response to this updating notification. In this method, there is the advantage that the amount of communication between the communication management system 200 and the communication terminals can be reduced, while there is the disadvantage that only old information is displayed at the communication terminals forever unless transmitted an information acquisition request.

Figure 6:
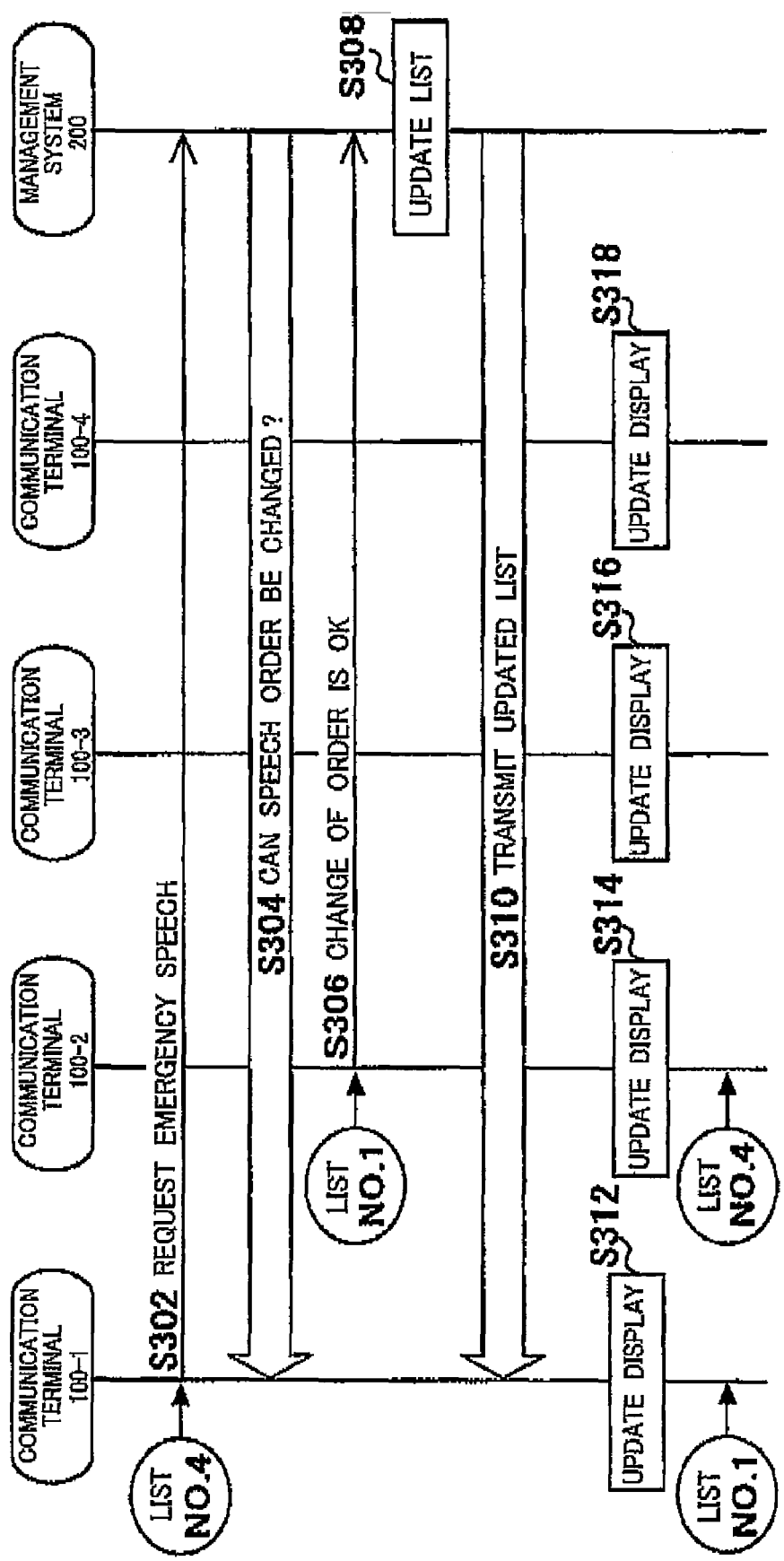
FIG. 6 is a diagram showing another example of an operation for changing the order of speech.

Therefore, in the example of FIG. 6, when the reservation list 111 is updated, the communication management system 200 transmits the information of the updated reservation list 111 to the communication terminals all together. The display control part 73 of each communication terminal updates the display at the display part 5 based on the received information whenever it receives the information of the reservation list 111 from the communication management system 200 at the communication part 2.

Steps S302, S304, S306, and S308 in FIG. 6 represent processing equal to steps S202, S204, S206, and S208 in FIG. 5.

When the reservation list 111 is updated at step S308, the control part 10 of the communication management system 200 transmits the information of the updated reservation list 111 from the communication part 8 to the communication terminals all together (step S310). The display control part 73 of each communication terminal updates the display of the display part 5 based on the above information received at the communication part 2 (steps S312, S314, S316, S318). Due to this, the display part 5 of each communication terminal displays the newest information concerning the reservation list 111 of the communication management system 200.

Note that the example of FIG. 6 shows an example of the case where the reservation list 111 is updated by the change of order of the transmission among communication terminals, but the invention is not limited to this. When the reservation list 111 is updated by for example the registration of a new communication terminal (step S116 of FIG. 4) or cancellation of reservation of speech mentioned later (step S402 of FIG. 7) as well, the information of the reservation list 111 may be transmitted from the communication management system 200 to communication terminals all together in the same way as that mentioned above.

Next, the operation of canceling a speech reservation of a communication terminal registered in the reservation list 111 will be explained with reference to FIG. 7.

For example, assume that the communication terminals 100-1, 100-2, 100-3, and 100-4 are registered at the third, second, first, and fourth places of the reservation list 111. At this time, when the user performs a predetermined operation for requesting the cancellation of the speech reservation at the key input part 3 of the communication terminal 100-2, the transmission control part 71 thereof transmits a request for reservation cancellation from the communication part 2 to the communication management system 200 (step S402).

When the communication part 8 of the communication management system 200 receives a request of the reservation cancellation described above, the control part 10 deletes the communication terminal 100-2 from the reservation list 111. Then, the communication terminals 100-1 and 100-4 which having lower places than that of the communication terminal 100-2 in the reservation list 111 are advanced in order to the second place and the third place (step S404).

When updating the reservation list 111 in this way, the control part 10 transmits the information of the new reservation list 111 from the communication part 8 to the communication terminals all together (step S406). The display control part 73 of each communication terminal updates the display of the display part 5 based on the information of the reservation list 111 received at the communication part 2 (steps S408, S410, S412, S414). Due to this, the display part 5 of each communication terminal displays the information concerning the new reservation list 111 in which the speech reservation of the communication terminal 100-2 is cancelled.

Figure 7:
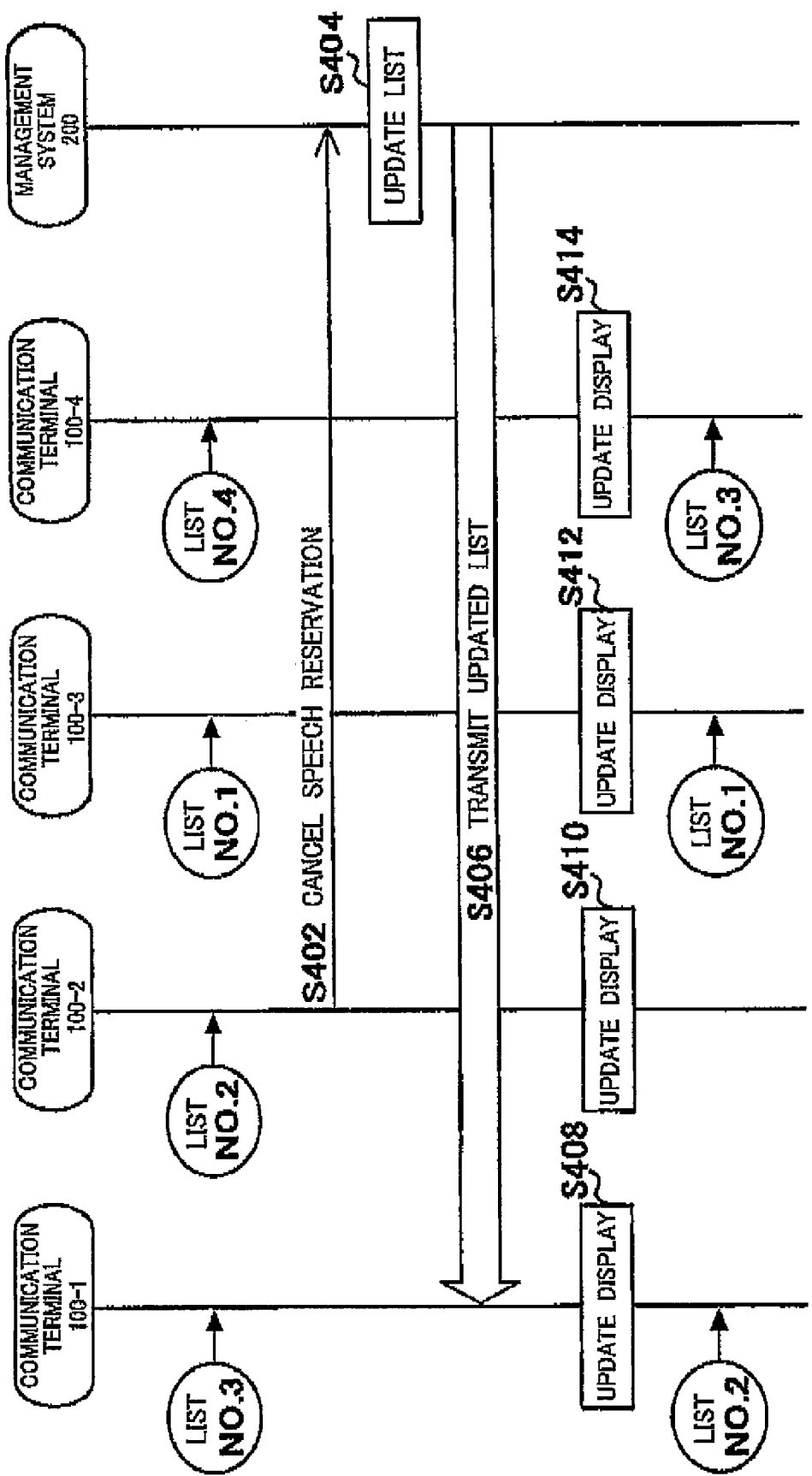
FIG. 7 is a diagram showing an example of an operation for canceling reservation of speech.

Note that, in the example of FIG. 7, the information of the updated reservation list 111 is transmitted from the communication management system 200 to the communication terminals all together in response to the reservation cancellation, but in the same way as the case of FIG. 5, the information of the updated list may be transmitted to only the communication terminal issuing the information acquisition request in response to the update notification of the list.

Next, an example of a screen 51 displayed in the display part 5 of the communication terminal will be explained with reference to FIG. 8.

The display control part 73 of the communication terminal displays, as the information concerning the reservation list 111, for example the information of communication terminals waiting for the transmission permission in the communication system and the information concerning the order of reception of transmission permission by those communication terminals on the screen 51 of the display part 5.

Figure 8:
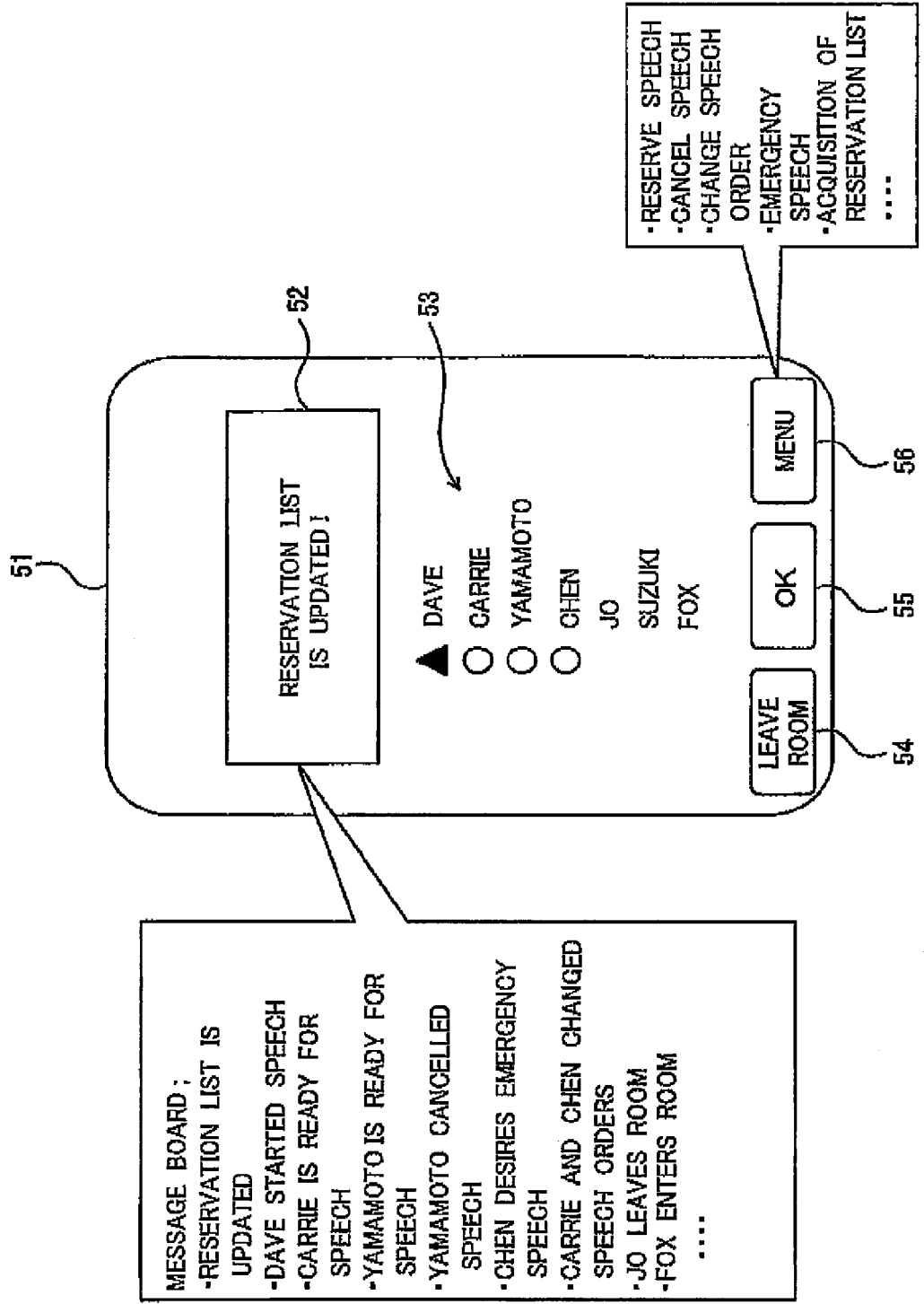
FIG. 8 is a diagram showing an example of a screen displayed at a display part of a communication terminal.

In the example of FIG. 8, the screen 51 has a message region 52 for displaying various types of notifications transmitted from the communication management system 200, a list 53 of all communication terminals in the communication system, and icons 54, 55, and 56 representing functions assigned to operation keys of the key input part 3.

The message region 52 may display, for example, the updating of the reservation list, the change of speaker, the change of speech order, the change of members participating in the group communication, and other notifications concerning various events occurring in group communication. Further, it may display a message transmitted from one communication terminal directed to the other communication terminals.

The list 53 of communication terminals displays the names of members as the information on the communication terminals participating in the group communication at present. As these member names, it may display the data of member names as registered in the communication management system 200 as they are or may display identification data (phone numbers etc.) provided from the communication management system 200 converted to member names at the communication terminals. In the latter case, the identification data may be converted to the member name based on a data table linking the identification data and member names for example an address book stored in the storage part 6 of the communication terminal.

In the example of FIG. 8, circle marks and a triangle mark are given in front of part of the member names displayed on the list 53. The circle marks represent members registered in the reservation list 111 at present, and the triangle mark represents the member during speech at present.

Further, the arrangement of the member names with the circle marks represents the order of receiving the transmission permission. In the example of FIG. 8, the transmission is permitted in the order of "Carrie", "Yamamoto", and "Chen".

The icon 54 represents the key operated when ending the group communication. The icon 55 represents the key operated when selecting an item on the menu screen. The icon 56 represents the key operated when displaying the menu screen. These icons 54, 55, and 56 are linked with for example the keys nearest the display parts of the icons among the keys provided at the key input part 3.

On the menu screen, commands for reservation and cancellation of speech, the change of the speech order, the transmission of an emergency speech request, and the acquisition of information of the reservation list can be selected by the operation of the key input part 3.

As explained above, according to the present embodiment, when a communication terminal requests transmission permission from the communication management system 200, the communication management system 200 provides the information concerning the communication terminals waiting for the transmission permission in the communication system to the communication terminal, and the display part 5 provided in the communication terminal displays the provided information.

Due to this, each communication terminal can determine the communication terminals waiting for the transmission permission in the communication system, therefore, even if transmission is not permitted at the point of time when it issues the request, it can estimate how long it will have to wait for obtaining the transmission permission. Accordingly, it is possible to reduce user dissatisfaction in comparison with the case where transmission is rejected unilaterally with no information given.

Further, a communication terminal transmitting a transmission permission request to the communication management system 200 is kept registered in the reservation list 111 of the communication management system 200 until it performs the transmission, therefore the communication terminal does not have to request transmission permission many times to the communication management system 200. For this reason, the operation of the communication terminal can be simplified and, at the same time, the amount of communication between the communication terminal and the communication management system 200 can be reduced.

Further, according to the present embodiment, when one communication terminal issues a request to the other communication terminals to change the order in the reception of the transmission permission, this request is notified to the other communication terminals and displayed at the display part 5 thereof. Then, when another communication terminal issues a response accepting this request, this acceptance response is notified to the communication terminal requesting the change of order and displayed at the display part 5 thereof. Further, in the reservation list 111 of the communication management system 200, the places of the terminal issuing the request for change of order and the terminal accepting that request are changed.

In this way, the order of reception of the transmission permission can be changed based on a mutual agreement between communication terminals, therefore, in comparison with the case where all of the order for reception of transmission permission is determined by the communication management system, smoother group communication can be realized.

Further, according to the present embodiment, when a communication terminal transmits a request to cancel the request for transmission permission to the communication management system 200, the communication terminal issuing this request is deleted from the reservation list 111 of the communication management system 200.

Due to this, a request for transmission permission which was unnecessarily issued by a communication terminal can be freely canceled, therefore smooth group communication can be realized.

Above, embodiments of the present invention were explained, but the present invention is not limited to only the above embodiments and includes various modifications.

Figure 4:
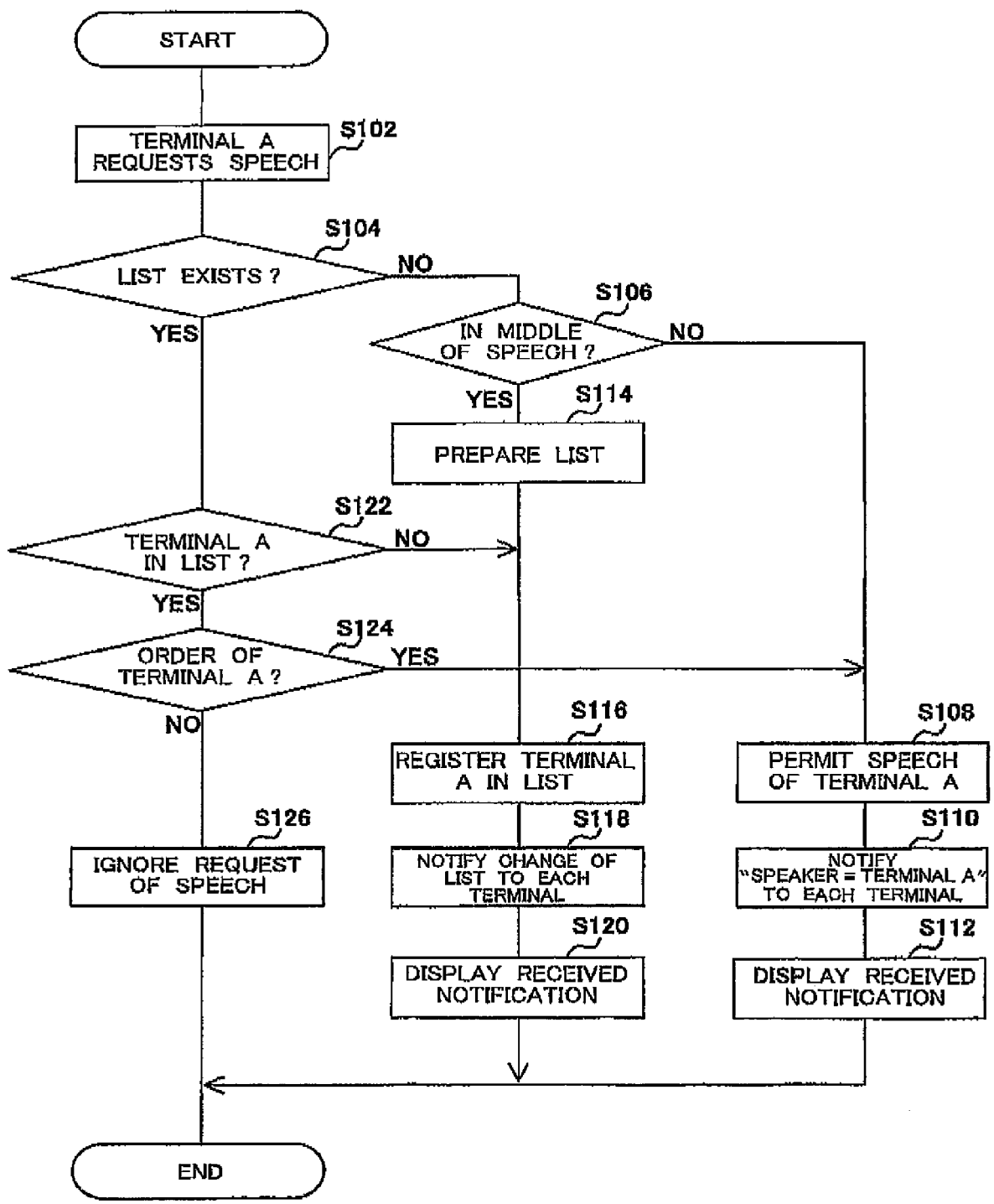
FIG. 4 is a diagram showing an example of an operation in a case where one communication terminal requests permission for speech.

For example, in the example of FIG. 4, when the reservation list 111 is stored in the communication management system 200, the terminal A is registered in this list, and the place of the terminal A indicated by this list has not yet been reached, the communication management system 200 ignores the transmission permission request of the terminal A (step S126). The registration of the same terminal in the reservation list 111 by the processing on the communication management system 200 side can be prevented in this way, but the same processing for prevention of registration can be realized even by processing on the communication terminal side.

For angle, the transmission control part 71 judges whether or not its own communication terminal is in a state waiting for transmission permission based on the information of the reservation list 111 received at the communication part 2. When judging that it is in a state waiting for the transmission permission, it prohibits the transmission of the transmission permission request from the communication part 2. By prevention of registration of the same terminal in the reservation list 111 by the processing on the communication terminal side in this way, the load of the communication management system 200 can be reduced.

When a certain communication terminal issues a request so as to change the order of transmission permission to other communication terminals, the communication management system 200 may transmit a notification concerning that request to all communication terminals or way transmit the same to only the communication terminals covered by the request. For example, in the example of FIG. 5, it may transmit an emergency speech request generated from the fourth place communication terminal 100-1 to all communication terminals or may transmit it to only the communication terminals higher than the fourth place (that is, the first place to third place communication terminals).

In the above embodiments, the example of applying the present invention to PoC group communication was explained, but the present invention is not limited to this. It can also be applied to various other types of group communication involving one-versus-multitude data communication.

The processing of the control part 7 of the communication terminal and the processing of the control part 10 of the communication management system 200 may all be executed by a computer based on a program, or at least a part thereof may be executed by hardware.

The communication terminal of the present invention is not limited to a mobile phone. For example, the present invention can be widely applied to terminals having communication functions such as PDAs (Personal Digital Assistants) and mobile game machines.

The invention claimed is:

1. A method of group communication among three or more communication terminals, the method comprising the steps of:
sending a permission request for transmission, while a first communication terminal is transmitting and a second communication terminal is at a top of a waiting list for transmission, from a third communication terminal to a management system;
registering the third communication terminal onto the waiting list upon receipt of the permission request;
sending notifications of events occurring in the group communication and information relating to the waiting list to all the communication terminals participating in the group communication from the management system; and
displaying the events in a text message region of each display screen of the communication terminals participating in the group communication and a list in a list region of the display screen, wherein the events are displayed as text,
wherein the list comprises identification data in the waiting list;
requesting emergency transmission to change an order of the waiting list to the top of the waiting list by the third communication terminal while the first communication terminal is transmitting; and
accepting the change in the order of the waiting list by the second communication terminal.

2. The method as set forth in claim 1, further comprising:
deleting the second communication terminal from the waiting list when the first communication terminal ends transmission and allowing a third communication terminal, which is at the top of the waiting list, to start transmission.

3. The method as set forth in claim 1, wherein
the list displayed in the list region is related to the event displayed in the text message region of the communication terminal in the waiting list on receipt of the request.

4. The method as set forth in claim 1, wherein
the list displayed in the list region comprises identifications of one or more terminals in the waiting list.

5. The method as set forth in claim 4, wherein
the list comprises all terminals participating in the group communication.

6. The method as set forth in claim 5, wherein
the list displayed in the list region comprises identifications of each terminal and the status of communication.

7. The method as set forth in claim 1, further comprising the steps of:
registering the third communication terminal onto the top of the waiting list upon acceptance of the emergency request by the second communication terminal.

8. A group communication system comprising three or more communication terminals, including a first communication terminal, a second communication terminal, and a third communication terminal, and a management system which gives one communication terminal a transmission permission among said three or more communication terminals to transmit data to the other,
wherein
the management system comprises:
a first communication unit operable to communicate with the communication terminals;
a storage unit operable to store a waiting list of communication terminals waiting for the transmission permission; and
a first transmission control unit operable to control the first communication unit to transmit notifications of events occurring in the group communication and information relating to the waiting list to all communication terminals participating in the group communication from the management system, and
each of the communication terminals comprises:
a second communication unit operable to communicate with the management system;
a display displaying a text message region and a list region, wherein the events are displayed as text;
a second transmission control unit operable to control the second communication unit to transmit the request for transmission permission to the management system;
a reception control unit operates to control the second communication unit to receive notification of events occurring in the group communication and the information from the management system after the request for transmission permission is transmitted; and
a display control unit displaying the notification in the text message region and the information received at the second communication unit at the list region of the display;
wherein when the third communication terminal transmits emergency request to change an order of the waiting list to the top of the waiting list while the first communication terminal is transmitting, the second communication terminal, which is a the top of the waiting list, accepts the change in the order of the waiting list.

9. The communication system as set forth in claim 8, wherein said display control unit updates the display of said display based on the received information when the list region information is received at said second communication unit.

10. The communication system as set forth in claim 8, wherein
an input unit enables input of an instruction requesting acquisition of the list region information;
said second transmission control unit controls said communication part to transmit said request for acquisition when the instruction is input; and
said second reception control unit controls said communication part to receive the list region information transmitted in response to said request for acquisition.

11. The communication system as set forth in claim 8, wherein each of the communication terminals further comprises:
an input unit that enables input of a request to other communication terminals waiting for said transmission permission to change the order of reception of said transmission permission and an acceptance of said request for change of order issued from another communication terminal, said second transmission control unit controls said communication part to transmit said request for change of order when said request is input at said input unit, and to transmit an acceptance of said request for change of order when the acceptance is input at said input unit, said second reception control unit controls said communication unit to receive a notification to the effect that another communication terminal in said communication system has issued a request for change of order and a notification to the effect that another communication terminal in said communication system has agreed to said request for change of order, and said display control unit displays said received notification on said display.

12. The communication system as set forth in claim 11, wherein said display control unit displays said notification received at said communication unit each time said notification is received.

13. The communication system as set forth in claim 8, wherein each of the communication terminals further comprises:

an input unit that enables input of cancellation of said request for transmission permission, said second transmission control unit controls communication unit to transmit said request for cancellation when said cancellation is input at said input part, said second reception control controlling communication unit to receive a notification to the effect that another communication terminal in said communication system has cancelled said request for transmission permission, and said display control unit displays said received notification on said display.

14. The communication system as set forth in claim 8, wherein said display control unit displays on said display information relating to the order by which said communication terminals receive said transmission permission.

15. The communication system as set forth in claim 8, wherein said display control unit displays on said display a list of all communication terminals in the order of reception of said transmission permission.

16. The communication system as set forth in claim 8, wherein said display control unit displays on said display a list of all communication terminals in said communication system in which communication terminals waiting for said transmission permission are given predetermined marks.

17. The communication terminal system as set forth in claim 8, wherein said second transmission control unit prohibits transmission of a request for transmission permission if a state of own communication terminal is in waiting for said transmission permission.

* * * * *